April 4, 1939. W. R. GRISWOLD 2,153,083
MOTOR VEHICLE
Filed Oct. 16, 1935 4 Sheets-Sheet 2
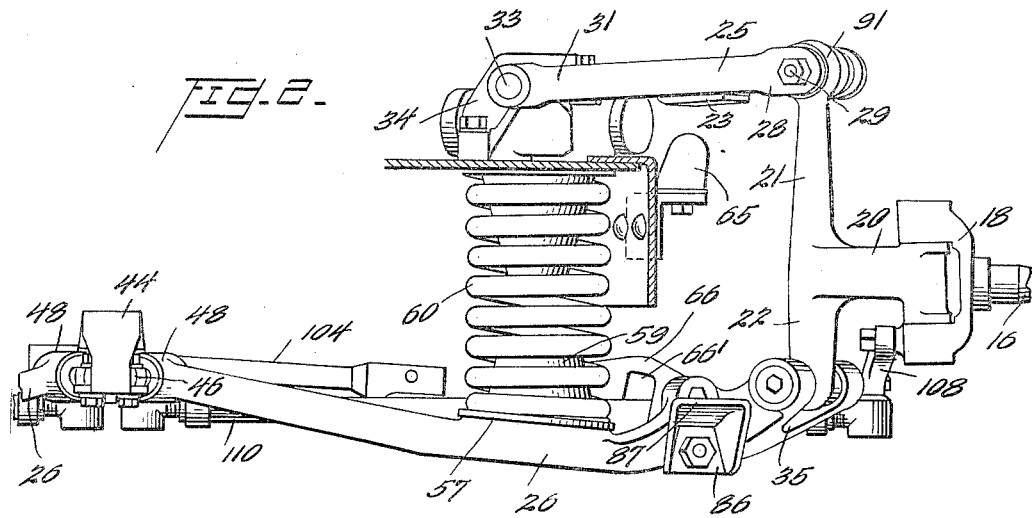
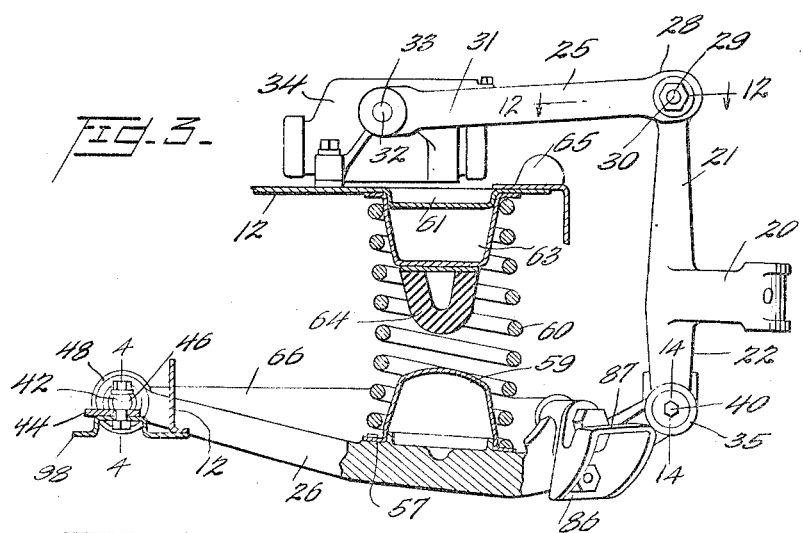
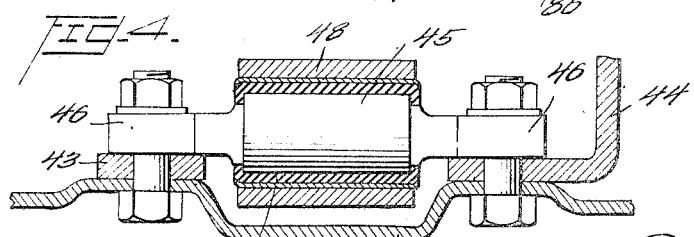

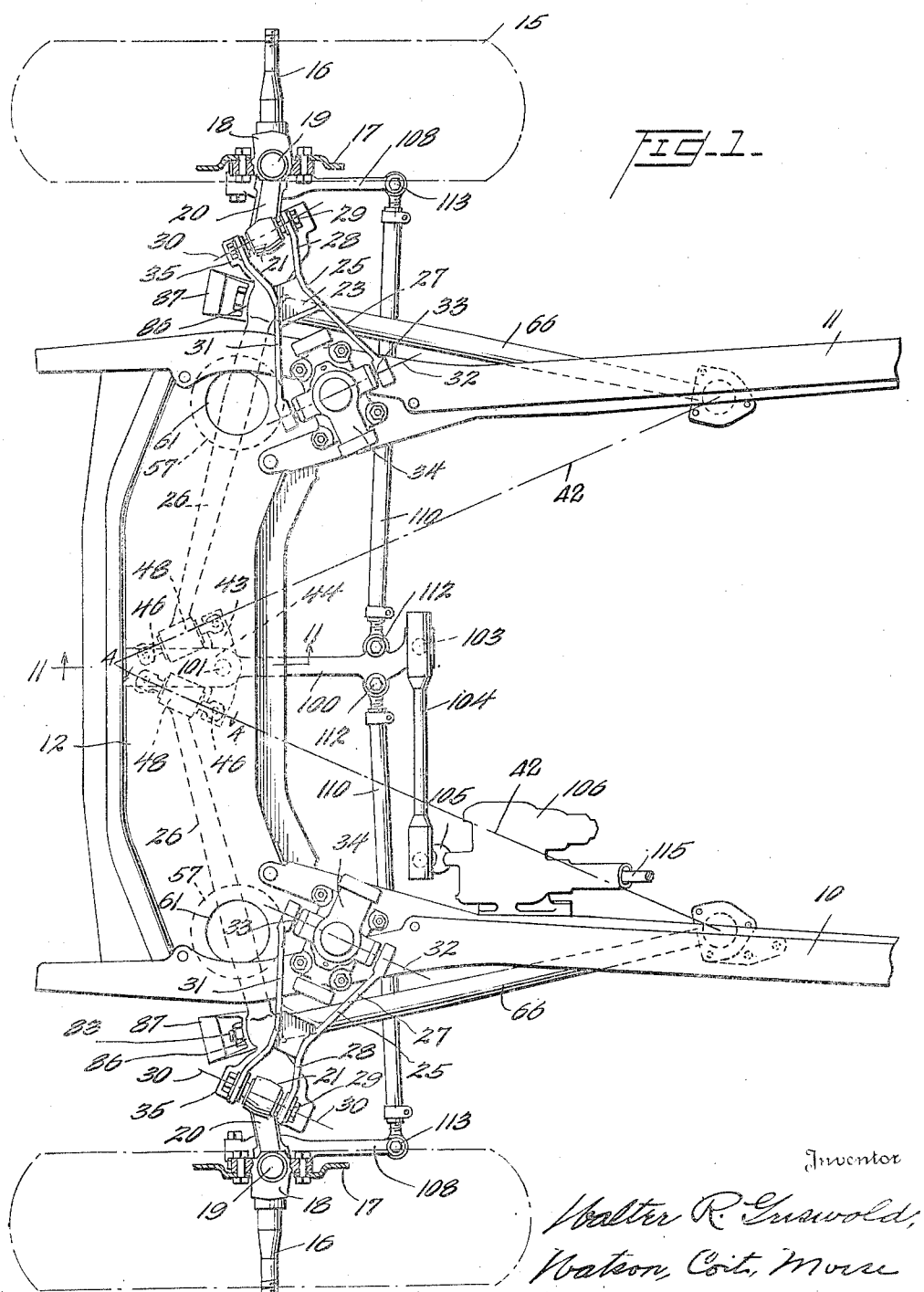

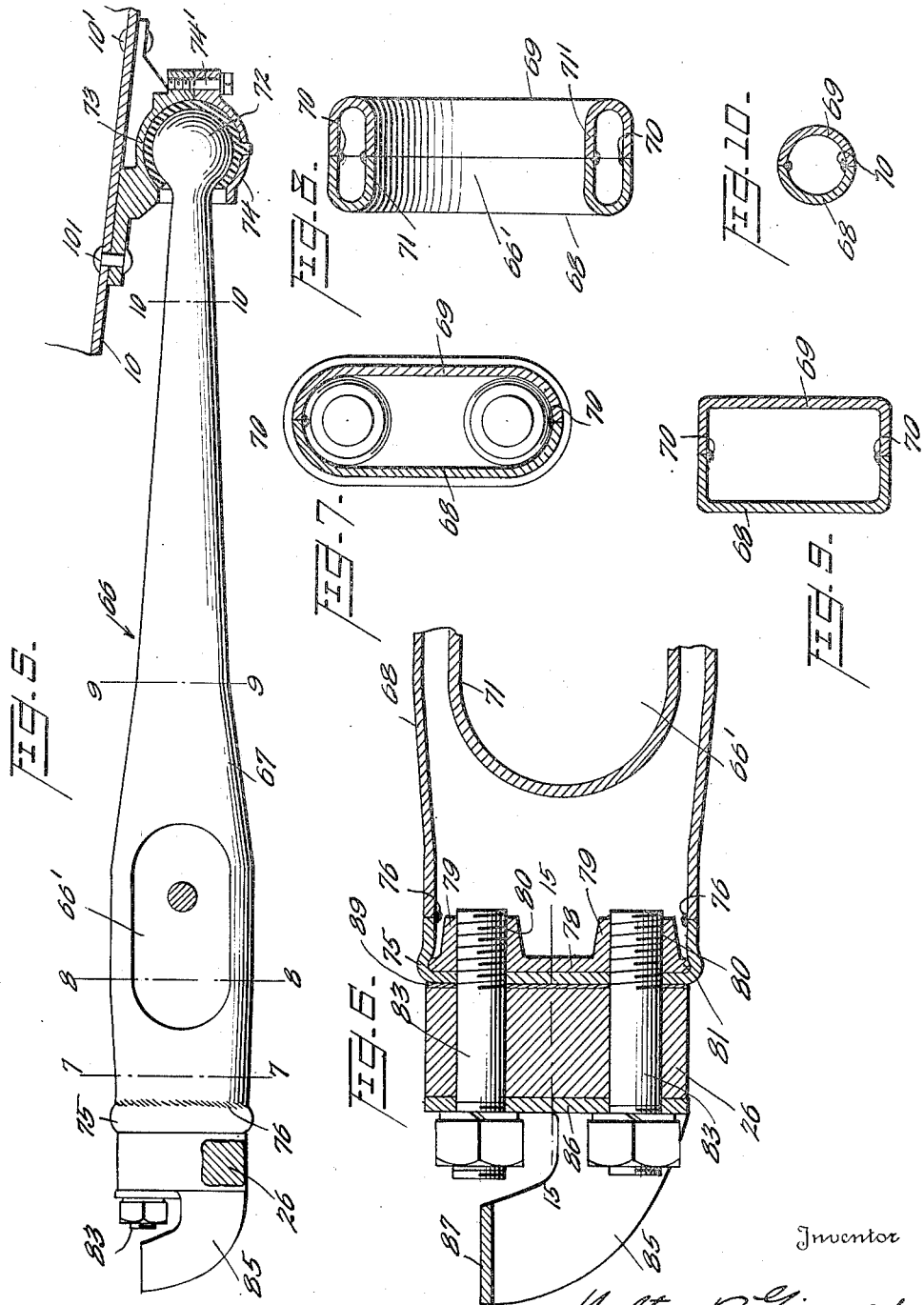

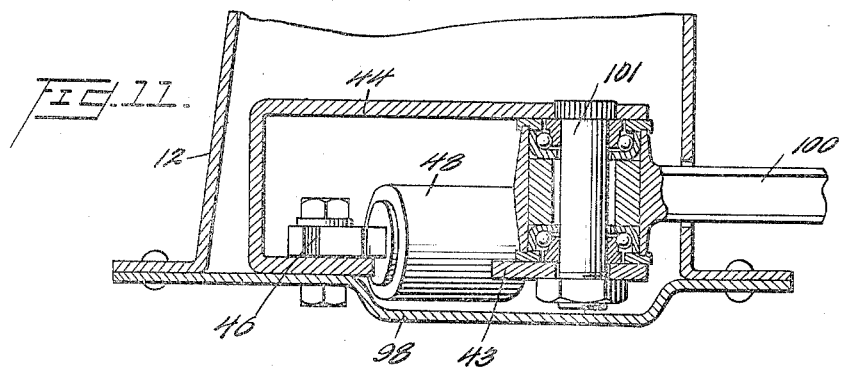
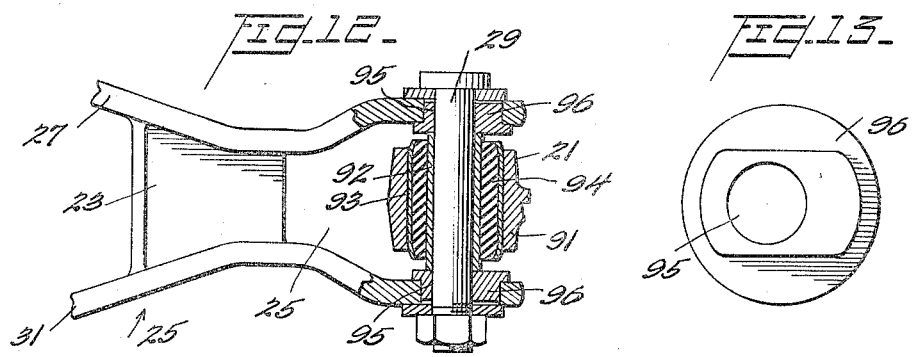
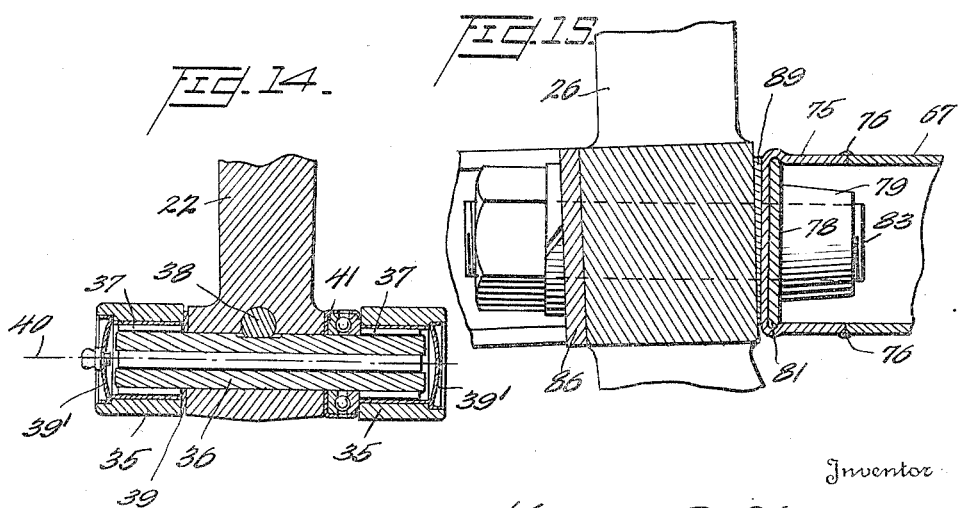

Patented Apr. 4, 1939

2,153,083

UNITED STATES PATENT OFFICE 2,153,083

MOTOR VEHICLE

Walter R. Griswold, Detroit, Mich., assignor to Packard Motor Car Company, Detroit, Mich., a corporation of Michigan Application October 16, 1935, Serial No. 45,347

18 Claims. (Cl. 280—124)

This invention relates to improvements in motor vehicles and more particularly to vehicles of the type in which the road wheels are independently sprung from the vehicle frame.

It is the principal object of the invention to provide a wheel supporting structure which will materially improve the riding qualities of the vehicle and the ease with which steering may be effected and which will afford the strength necessary to withstand hard usage.

It is a feature of the invention that the weight of the vehicle suspension, and particularly the unsprung weight, is reduced to a minimum, the structure being nevertheless sufficiently sturdy for operation under the most severe conditions and when employed in heavy vehicles.

The invention is particularly concerned with independent wheel suspensions of the type employing laterally extending links, frequently referred to as the parallel link type of suspension. The construction preferably involves the provision of a torque arm extending generally longitudinally of the vehicle frame, this torque arm being secured rigidly to that link which carries the greater load, both links and the torque arm being so shaped and constructed as to afford maximum strength without undue increase in weight.

It is a further feature of the invention, in the application thereof to steerable road wheels, that the wheel caster angle may be readily and accurately determined and that uniformity of action of the suspension means and the steering mechanism associated with the opposite road wheels may be ensured regardless of slight variations in the length or form of the component parts of the vehicle frame and wheel suspension such as result from manufacturing inaccuracies.

Further objects and features of the invention will be apparent from the following description, taken in connection with the accompanying drawings, in which Figure 1 is a plan view of a portion of a motor vehicle frame illustrating the application thereto of one form of the present invention;

Figure 2 is a front elevation of the wheel suspension shown in Fig. 1, one side only of the vehicle being illustrated;

Figure 3 is an elevational view, partly in section, corresponding to Fig. 2 and taken in the direction of the axes of the wheel supporting links;

Figure 4 is a partial sectional view taken substantially on the line 4—4 of Fig. 3;

Figure 5 is an elevation of a preferred form of torque arm, certain associated parts being shown in section;

Figure 6 is a fragmentary sectional view at one end of the torque arm shown in Fig. 5;

Figure 7 is a section taken on the line 7—7 of Fig. 5;

Figure 8 is a section taken on the line 8—8 of Fig. 5;

Figure 9 is a section taken on the line 9—9 of Fig. 5;

Figure 10 is a section on the line 10—10 of Fig. 5;

Figure 11 is a fragmentary sectional view on the line 11—11 of Fig. 1;

Figure 12 is a section on the line 12—12 of Fig. 3;

Figure 13 is a detailed elevation of an element illustrated in Fig. 12;

Figure 14 is a sectional view on the line 14—14 of Fig. 3; and

Figure 15 is a sectional view on the line 15—15 of Fig. 6.

In describing the invention, reference will be made to the drawings illustrating one form of the invention only in the application thereof to the front steerable road wheels of a vehicle. It will nevertheless be understood that certain features of the wheel suspension shown herein are equally as applicable to the rear road wheels and to road wheels which are not steerable. It will furthermore be appreciated that while the various elements disclosed in the drawings are described hereinafter by specific language in order to facilitate an understanding of the principles of the invention and to simplify this descriptive matter, no limitation of the invention is thereby intended, various alterations of the structural details such as fall within the scope of the invention as defined in the appended claims being contemplated.

Referring first to Figures 1 and 2 of the drawings, it will be observed that the vehicle frame is illustrated as including side frame members 10 and 11, which may be of the usual channel or box type, and a cross frame member 12 extending between and rigidly secured to the two side frame members 10 and 11 adjacent the forward end of the latter. So far as the wheel suspension is concerned, the construction is preferably identical at the two sides of the vehicle, and it will therefore suffice in the following description to refer to those elements of the suspension disposed at one side only of the central longitudinal plane of the vehicle, the same reference characters being used in connection with corresponding elements associated with the two road wheels.

Thus each road wheel 15 is rotatably mounted in the conventional manner on a wheel spindle 16, the latter being provided with the usual brake backing plate 17. The wheel spindle 16 is preferably formed integrally with a steering knuckle 18, the latter being supported for swinging steering movement on a knuckle carrying member 20, for instance, by means of the usual king pin 19 which may extend through the knuckle and its supporting member.

The knuckle carrying member 20 is formed to provide upstanding and downwardly directed arms 21 and 22 which constitute with the member 20 an integral unit. These integrally formed arms are pivotally connected respectively to upper and lower wheel supporting links 25 and 26 which are in turn pivotally connected at their inner ends to the vehicle frame. Thus the outer end of the wheel supporting link 25 may be formed to provide a yoke-shaped portion 28 embracing the upper end of the arm 21 of the knuckle carrying member 20, a bolt 29 passing through the link 25 and the member 20 to connect the link and the member for relative movement about a pivotal axis 30. The inner end of the link 25 is similarly supported on the frame for pivotal movement with respect thereto about an axis 32, the axes 30 and 32 being parallel.

For instance, the upper wheel supporting link 25 may be formed to provide yoke-shaped portions at each end thereof by reason of the employment of two elongated members 27 and 31 which, together with an intermediate web portion 23, comprise the generally X-shaped and preferably integral structure of the upper link. At its inner end the link 25 straddles a shock absorber 34, the members 27 and 31 of the link being secured to opposite ends of the operating shaft 33 of the shock absorber, the latter being bolted to the vehicle frame as indicated in Fig. 1. The shaft 33 is supported in the shock absorber housing for oscillating movement, and thus defines the axis 32 hereinbefore mentioned. The details of the shock absorber form no part of the present invention; preferably a hydraulic shock absorber is employed, the operating pistons of the shock absorber being reciprocated in the conventional manner upon actuation of the shaft 33 as the link 25 rises and falls with the road wheel with which it is associated. Damping of the movement of the road wheels is thus effected in the usual way.

The lower wheel supporting link 26 is similarly pivotally connected to the knuckle carrying member 20 and to the vehicle frame for swinging movement with respect to both about axes indicated at 40 and 42 respectively, the pivotal connection at the inner end of the wheel supporting link 26 to the frame including brackets 43 and 4 which are secured to the cross frame member 12.

For example, the outer end of the lower wheel supporting link 26 may be forked as indicated at 35 to embrace the lower end of the downwardly directed arm 22 of the knuckle carrying member 20, a pin 36 affording a pivotal connection between these two members on the axis 40. The wheel carrying member 20 is preferably locked to the pin 36 by means of a pin 38, needle bearings 37 being provided between the forked portion 35 of the link 26 and the pin 36, these bearings being retained in position by means of a washer 39 and locking plate 39′, the latter being secured against displacement in the forked portion of the link by spinning over the ends of the latter. A thrust bearing 41 may be interposed between the wheel carrying member 20 and the rearward side of the forked portion of the link 26.

At its inner end the link 26 may be connected to the frame for pivotal movement about the axis 42 by means of a bearing spindle 45 which is provided with flattened end portions 46, the latter being bolted to the brackets 43 and 44. The inner end of the link 26 is formed to provide a boss 48 which surrounds the bearing spindle 45, a bushing 49 of rubber or other deformable material being interposed between and surface bonded to the boss and the spindle, for instance by vulcanizing. Rising and falling movement of the wheel and resulting oscillation of the link 26 about the axis 42 is thus permitted, the rubber being stressed as the result of such movement. This type of bearing requires no lubrication and is capable of absorbing vibration and preventing the transmission of shock, to a limited extent, between the road wheel and the vehicle frame.

It will be observed that the lower wheel supporting link 26 is of greater length than the upper wheel supporting link 25. By reason of this difference in the length of the links, the plane of the road wheel is altered as the wheel rises, the upper portion of the wheel moving inwardly to a greater extent than the lower portion thereof. This inclination of the plane of the wheel as it rises is utilized to compensate for the inward shifting of the tread portion which ordinarily occurs when parallel links of the same length are employed, and the point of contact of the tread with the ground is caused to rise substantially vertically with the result that scuffing of the tires is avoided.

Intermediate the ends thereof the link 26 is provided with an enlarged portion constituting a circular spring seat 57, a spring guide 59 for a coil spring 60 being received on the spring seat. The cross frame member 12 is provided with a depressed and generally circular portion 61 affording an upper seat for the spring 60, a spring guide 63 being received on the seat 61. Secured to the under side of the guide 63 is a cushion 64 of rubber or other deformable material which serves as an abutment for engagement with the spring guide 59 to limit upward movement of the link 26 and the road wheel assembly associated therewith. Downward movement of the linkage and wheel assembly may be limited by means of an abutment 65 of rubber or the like which may be secured to the adjacent side frame member 10 for cooperative engagement with the web portion 23 of the upper link 25 as the latter approaches its limit of downward movement.

In order to adequately resist braking torque and other stresses in the wheel suspension, a torque arm 66 is provided, this torque arm extending generally longitudinally of the vehicle frame, having an articulated connection at the rear end thereof with the vehicle frame, and being connected, preferably rigidly, at its forward end with the lower wheel supporting link 26. In the preferred form of the invention the torque arm is constructed principally of flat metal stock which is formed so as to afford maximum strength and rigidity without undue increase in weight. For instance, the torque arm which is illustrated more particularly in Figs. 5 to 10 inclusive of the drawings is formed principally of a body portion 67 comprising two oppositely disposed sections 68 and 69 which are welded together above and below in a substantially vertical plane as indicated at 70. The transverse configuration of the arm at different points in its length is indicated in Figs. 7 to 10 inclusive, the arm body being generally rectangular in sectional outline adjacent the forward end and generally circular in outline near the rearward end, the extreme rear end of the arm being formed to provide a substantially spherical portion 72 which is received in a two piece spherical socket 73, 74, bolted together as at 74' and secured at 101 to the lower flange of the side frame member 10. Interposed between the spherical portion 72 of the arm and the interior of the socket 73, 74 is a sheath of rubber or other deformable material which is surface bonded to both members, for instance by vulcanization or the like. It will be appreciated that this construction permits the arm to partake of limited swinging movement about the center of the spherical head 72 as the road wheel assembly rises and falls, the deformable sheath yielding to permit such movement.

Intermediate the ends thereof, the sections 68 and 69 of the torque arm are pressed inwardly to provide engaging flanges 71 and 71', these flanges defining an elongated aperture 66' for a purpose hereinafter described. It will be appreciated that this construction materially strengthens the torque arm without increasing the weight thereof.

At the extreme forward end of the torque arm a generally cup-shaped head 75 is provided, this head being preferably welded as indicated at 76 to the body portion 67 of the arm. Seated within the head 75 is a member 78 provided with bosses 79 having threaded apertures 80 therein. The head 75 is crimped over a base flange 81 on the body 78 before being welded to the body portion 67 of the torque arm so that the member 78 is securely retained in position.

The head 75 of the torque arm abuts the lower link 26 and is secured thereto by means of bolts 83 passing through the link and threaded into the member 78 which forms part of the assembled torque arm 65. It will thus be observed that the torque arm and lower link form a rigid structure and constitute in effect a single wheel supporting link pivoted to the vehicle frame at widely spaced points. As the road wheel assembly rises and falls, this link structure will swing about the axis 42 which passes through the bearing spindle 45 at the inner end of the link 26 and through the center of the spherical portion 72 of the torque arm 66. It will also be appreciated that this structure transmits practically all of the stress and load between the road wheel assembly and the vehicle frame, the upper link 25 serving merely as a guide and shock absorber.

Difficulty has been experienced with various types of independent wheel suspension in jacking up either wheel for the purpose of removing the same on tire failure, there being no convenient point for application of a jack. In order to remove this difficulty, a jack-engaging bracket 85 is associated with the lower wheel supporting link 26, this bracket being conveniently secured to the link by one or more of the bolts 83 which serve to connect the link with the torque arm 66, the construction being clearly shown in Fig. 6 of the drawings. Thus the bracket 85 may be provided with a generally vertically disposed attaching flange 86 which is apertured to receive the bolts 83 and with a horizontally extending flange 87 with which the jack may cooperate, the flange 87 forming the base of the generally U-shaped structure.

It is important to insure that the caster and camber angles be accurately determined and yet it is found desirable to avoid the employment of a construction whereby these angles may be readily adjusted by the mechanic, it being found that adjustment is ordinarily unnecessary once the angles have been definitely and properly established and that an inexperienced workman is likely to disturb the proper relation of the several members of the wheel suspension and steering mechanism when means for effecting ready adjustment is provided. In the construction shown herein the desired relation of the parts may be initially established and maintained regardless of slight inaccuracies in the dimensions of the several elements as manufactured.

Thus it is preferred to provide a series of shims which may be inserted intermediate the torque arm 66 and the lower wheel supporting link 26, these shims being of different thickness, whereby the selection of a shim of the proper thickness will effect forward displacement of the outer end of the link 26 to the extent necessary to establish the proper caster angle. One of these shims is shown in position at 89 in Figs. 6 and 15 of the drawings, it being observed that the shim tapers inwardly to a slight extent so as to bear over its entire surface against the forward face of the torque arm 66 and the rearward face of the link 26 regardless of the extent to which the outer end of the latter has been displaced forwardly of the frame. It will be understood that displacement of the link 26 is permitted by reason of the fact that the bearing connection at the inner end of the link to the frame is effected through a sheath of rubber or the like.

It is also found that owing to inaccuracy of manufacture the vehicle frame occasionally differs slightly in length at opposite sides of the frame, resulting in relative longitudinal displacement of the outer ends of the opposite wheel supporting links 26, whereby the vehicle tends to steer to one side or the other. This difficulty can also be overcome by the introduction of a shim of proper thickness between one of the torque arms 66 and associated link 26, the shim employed for this purpose being ordinarily of uniform thickness and having no taper.

The preferred method of determining the camber angle of the road wheel assembly is indicated more particularly in Figs. 12 and 13 and involves the selection of properly dimensioned means for connecting the road wheel assembly with the upper link 25. Thus it will be observed that a pivot pin 29 passes through the yoke shaped portion at the outer end of the upper link and through a boss 91 at the upper end of the arm 21 which forms part of the knuckle carrying member 20. A bushing 92 surrounds the pin 29 and a sleeve 93 is fitted within the boss 91, a sheath of rubber or other deformable material 94 being interposed between the bushing and sleeve and surface bonded thereto, this sheath being stressed slightly as the wheel assembly rises and falls. The ends of the pin 29 extend through apertures 95 in sleeves 96, the sleeves 96 being rectangular or otherwise non-circular in outline and being fitted within corresponding openings in the yoke shaped portions at the outer end of the link 25. A number of these sleeves 96 are provided, the different sleeves of the series having the apertures 95 thereof located in different positions as measured outwardly of the link. It will thus be observed that by the selection of the properly dimensioned sleeve 96, the pivot pin 29 may be established in the proper position to support the road wheel assembly at the desired camber angle. As hereinbefore explained, adjustment of the properly established camber angle is found not only unnecessary but undesirable.

As shown in Fig. 11, the cross frame member 12 is generally U-shaped in vertical section and is provided with forwardly and rearwardly directed flanges at the lower side thereof. A plate 98 is secured to these flanges at the central portion of the frame and to the plate 98 is secured the brackets 43 and 44 hereinbefore mentioned on which the inner ends of the wheel supporting links 26 are pivotally mounted. These brackets also serve as a fulcrum for a centrally disposed steering arm 100, the arrangement being illustrated more particularly in Fig. 11 and including a pivot pin 101 which is secured in the arms of the brackets, the steering arm 100 being journaled on the pin 101 for swinging movement in a generally horizontal plane. Adjacent its rearward end the steering arm is provided with an articulated connection 103 to a steering link 104, the latter being similarly connected to a steering arm 105 which is journaled in the steering gear housing 106 and actuated by gearing within the latter in the conventional manner.

The central steering arm 100 is also connected to the steering knuckle arms 108 which are secured to the road wheel assemblies at opposite sides of the vehicle by means of steering links 110, the latter having universal joint connection with the arms 100 and 108 at 112 and 113 respectively, the steering links 110 extending through the apertures 66', hereinbefore described, in the torque arms at the respective sides of the vehicle.

As explained more particularly in my prior application for Letters Patent, Serial No. 702,615, filed Dec. 15, 1933, in which a generally similar type of wheel suspension is disclosed, the construction is such that the rearward ends of the steering knuckle arms 108 describe during rising and falling movement of the respective road wheels arcs which are substantially circular over the limited range of such movement. The arcs thus described may each be considered as defining a portion of the base of a right circular cone of which the apex coincides with the point 112 of pivotal connection between the associated steering link 110 and the steering arm 100. It will thus be appreciated that the road wheel assemblies may rise and fall without affecting the relationship of the several parts of the steering mechanism, and perfect steering is thereby attained. Steering is of course effected by manipulation of the conventional steering hand wheel at the upper end of the steering column 115, the central steering arm 100 being swung to one side or the other to effect the necessary movement of the steering knuckle arms 108 and the associated road wheel assemblies.

Having thus described the invention, what is claimed as new and desired to be secured by Letters Patent is:

1. In an independent wheel suspension for motor vehicles, the combination with a vehicle frame, of a road wheel assembly, means associated with said road wheel assembly supporting the latter for rising and falling movement with respect to the vehicle frame, said means comprising a plurality of laterally extending links pivotally connected to said frame and to said road wheel assembly, a torque arm acting between said frame and one of said links for resisting braking torque, and means associated with said torque arm and last named link for initially adjusting and determining the caster angle of the road wheel to compensate for slight manufacturing variation in the dimensions of the several elements of the suspension.

2. In an independent wheel suspension for motor vehicles, the combination with a vehicle frame, of a road wheel assembly, means associated with said road wheel assembly supporting the latter for rising and falling movement with respect to the vehicle frame, said means comprising a plurality of laterally extending links pivotally connected to said frame and to said road wheel assembly, a torque arm acting between said frame and one of said links for resisting braking torque, and means associated with said torque arm and last named link for determining the caster angle of the road wheel, said last named means comprising a spacing device interposed between the torque arm and associated link at the point of connection thereof.

3. In an independent wheel suspension for motor vehicles, the combination with a vehicle frame, of a road wheel assembly, means associated with said road wheel assembly supporting the latter for rising and falling movement with respect to the vehicle frame, said means comprising a plurality of laterally extending links pivotally connected to said frame and to said road wheel assembly in generally superposed relation, and means for fixing the relative fore and aft positions of the points of connection of said links to said road wheel assembly to determine the caster angle of said road wheel, said last named means including a torque arm pivoted to said frame and rigidly connected to one of said links, and shim means interposed between said torque arm and the associated link.

4. In an independent wheel suspension for motor vehicles, the combination with a vehicle frame, of a road wheel assembly, means associated with said road wheel assembly supporting the latter for rising and falling movement with respect to the vehicle frame, said means comprising a plurality of laterally extending links pivotally connected to said frame and to said road wheel assembly, the pivotal connection between at least one of said links and said wheel assembly including a pivot pin, and means for accurately determining the camber angle of the road wheel regardless of slight dimensional variation of the component parts of the suspension, said last named means including a non-adjustable connector between said road wheel assembly and one of said links of such selected dimensions that the proper relative lateral position of the upper and lower portions of the wheel assembly may be established, said connector including a sleeve receivable by said link in one position only and secured thereto, said sleeve being apertured to receive said pivot pin at a selected point measured laterally of the link.

5. In an independent wheel suspension for motor vehicles, the combination with a vehicle frame, of a road wheel assembly, means associated with said road wheel assembly supporting the latter for rising and falling movement with respect to the vehicle frame, said means comprising a plurality of laterally extending links pivotally connected to said frame and to said road wheel assembly, a torque arm acting between said frame and one of said links for resisting braking torque, and a jack bracket associated with said last named link and rigidly connected to said link and said torque arm.

6. A hollow torque arm or similar structural member including two segmental halves of thin metal welded together, said member having an opening through it, and a continuous wall around said opening formed by flanges bent up from said segments, the portion of said member which includes said opening being of increased depth over that of the adjacent portions.

7. A hollow torque arm or similar structural member comprising two segments of thin metal welded together and a third cup-shaped piece of thin metal with its edges welded to the first two parts.

8. A hollow torque arm or similar structural member comprising two segments of thin metal welded together and a third cup-shaped piece of thin metal with its edges welded to the first two parts and a fourth part secured within said third member.

9. A torque arm or similar structural member the middle portion of which comprises a pair of spaced apart tubular members and the ends of which comprise single tubular members merging into the first two, the middle portion being of increased depth over that of the adjacent portions.

10. A torque arm for automobiles having an inner rocking end for attachment to a bearing on the frame and an outer heavy end for rigid attachment to a wheel-carrying member, the body of said torque arm being a hollow box comprising thin metal segments welded together along their edges and the outer end portion comprising a reinforced member with edges welded to the body.

11. A torque arm for automobiles having an inner rocking end for attachment to a bearing on the frame and an outer heavy end for rigid attachment to a wheel-carrying member, the body of said torque arm being a hollow box comprising thin metal segments welded together along their edges, said segments having bent up flanges at an intermediate point in their length which when the segments are welded constitute a wall surrounding an opening through the body, the portion of the arm which includes said opening being of increased depth over that of the adjacent portions.

12. A torque arm for automobiles having an inner rocking end for attachment to a bearing on the frame and an outer heavy end for rigid attachment to a wheel-carrying member, the body of said torque arm being a hollow box comprising thin metal segments welded together along their edges and the outer end portion comprising a reinforced member with edges welded to the body, the reinforcement of said end portion comprising a separate member on the inner face of said end portion and held in place by the sides thereof.

13. The combination with an automobile frame of a wheel-carrying member on which said frame bears yieldingly and a torque arm having an inner end attached with a rocking engagement to a side portion of the frame and an outer end attached to said wheel-carrying member, said torque arm being a hollow box comprising thin metal segments extending from the outer end portion to and including the rocker end and welded together along their edges.

14. The combination with an automobile frame of a wheel-carrying member on which said frame bears yieldingly and a torque arm having an inner end attached with a rocking engagement to a side portion of the frame and an outer end attached to said wheel-carrying member, said torque arm being a hollow box comprising thin metal segments welded together along their edges and extending from the outer end portion to and including the rocker end and a separately formed outer end portion welded to the ends of said segments.

15. The combination with an automobile frame of a wheel-carrying member on which said frame bears yieldingly and a torque arm having an inner end attached with a rocking engagement to a side portion of the frame and an outer end attached to said wheel-carrying member, said torque arm being a hollow box comprising thin metal segments welded together along their edges and having also inner bent up flanges which when the segments are welded constitute a wall surrounding an opening through the arm, to accommodate a steering rod extending through said opening, the portion of the arm which includes said opening being of increased depth over that of the adjacent portions.

16. The combination with an automobile frame of a wheel-carrying member on which said frame bears yieldingly and a torque arm having a body portion which is a hollow closed box, and having an inner end attached with a rocking engagement to a side portion of the frame and having an outer end portion, and a nut by which the torque arm is attached to said wheel-carrying member, said nut being enclosed and rigidly held in said end portion of the arm.

17. A torque arm or similar structural member in the form of a hollow box comprising sheet metal segments of minimum thickness for the required strength welded together at the edges to form continuous stiffening joints which entirely close the box and prevent the entrance of dirt or water, and a reinforcing piece enclosed within said box at an end thereof for connecting the same to an adjacent part.

18. A torque arm for automobiles having an inner rocking end for attachment to a bearing on the frame and an outer heavy end for rigid attachment to a wheel-carrying member, the entire length of said torque arm being made in the form of a hollow box comprising sheet metal segments of minimum thickness for the required strength welded together at the edges to form continuous stiffening joints entirely closing the box against the entrance of dirt or water, and a reinforcing piece enclosed within the outer heavy end.

WALTER R. GRISWOLD.